United States Patent [19]

Gilowski

[11] Patent Number: 5,027,566
[45] Date of Patent: Jul. 2, 1991

[54] WINDOW WITH REFLECTIVE ENCLOSURE

[76] Inventor: John P. Gilowski, 5217 Partridge Rd., Fort Worth, Tex. 76132

[21] Appl. No.: 508,777

[22] Filed: Apr. 12, 1990

Related U.S. Application Data

[63] Continuation-in-part of Ser. No. 304,706, Feb. 1, 1989, abandoned.

[51] Int. Cl.$^5$ .............................................. E06B 1/38
[52] U.S. Cl. ......................................... 52/18; 52/200; 52/201
[58] Field of Search ..................... 52/200, 22, 28, 18, 52/201, 27, 36, 171

[56] References Cited

U.S. PATENT DOCUMENTS

| | | | |
|---|---|---|---|
| 2,006,648 | 7/1935 | Nobbs | 52/18 |
| 2,604,670 | 7/1952 | Horowitz | 52/200 |
| 4,141,498 | 2/1979 | Marchner | 47/17 |
| 4,339,900 | 7/1982 | Freeman | 52/200 |
| 4,428,358 | 1/1984 | Adamson | 52/200 |
| 4,577,619 | 3/1986 | Howe | 52/200 |
| 4,733,505 | 3/1988 | Van Dame | 52/200 |
| 4,761,716 | 8/1988 | Mori | 52/28 |
| 4,833,838 | 5/1989 | Van Dame | 52/200 |
| 4,916,872 | 4/1990 | Young | 52/200 |

Primary Examiner—John E. Murtagh

[57] ABSTRACT

The vertical reflective enclosure, containing a double-pane bay window panels, with movable inserts between the panes, which function as shading devices, and a light reflective panels directly extending above the bay window panels at top portion, intended to channel the sunlight and an outside view from the translucent roof membrane to the exterior wall installed transparent mirror window. This enclosure, in the form of a bay shaft configuration adapted for positioning around such window, is attached at the upper end around the translucent roof membrane and at the bottom and terminated below the wall window. The bay window inside panes are made of reflective material so that the bay window panels having highly reflective surface with fully drawn shading devices, while being light translucent with pulled up the shading devices, thereby camouflaging an unpleasant outside view, opening up the house room to a pleasant illusionary vista due to the endless reflecting, enhancing light and view channeling to a dusky rooms, improving security, reducing noise level, securing privacy, and saving energy.

4 Claims, 4 Drawing Sheets (Sec. C-C)

(Sec. A-A)

(Sec. B-B)

WINDOW WITH REFLECTIVE ENCLOSURE

This application is a continuation-in-part of my co-pending application Ser. No. 07/304,706, filed Feb. 1, 1989, now abandoned.

BACKGROUND OF THE INVENTION

1. Field of the Invention

This invention relates to the addition of a wall window with a reflective enclosure for use in houses, apartments or commercial establishments without a pleasant view or sufficient sunlight or both. The main object of this invention is to camouflage an unpleasant outside view, open up an area within a structure to a pleasant illusionary vista, improve light or add a view of the sky.

2. Description of the Prior Art

There are considerable prior art structures relating to improvements in roof windows or skylight design and which combine artificial light and natural light sources for day or night illumination. Examples of such structures can be found in the following U.S. Pat. Nos.

Freeman (U.S. Pat. No. 4,339,900) issued July 20, 1982;

Van Dame (U.S. Pat. No. 4,733,505) issued Mar. 29, 1988;

and Mori (U.S. Pat. No. 4,761,716) issued Aug. 2, 1988.

There are also considerable prior art structures relating to improvements in bay or garden windows adapted to fit in the opening of a standard wall window frame. Examples of such structures can be found in the following U.S. Pat. Nos.:

Buck, Jr. (U.S. Pat. No. 4,009,546) issued Mar. 1, 1977 and

Ruggiari, Jr. (U.S. Pat. No. 4,023,306) issued May 17, 1977.

Such known structures have, generally speaking, been constructed to improvement illumination of a room by way of natural or artificial light, save energy, add extra space and/or enhance the interior appearance of the room. However, many important options and considerations, such as directing light through a wall-opening in lieu of ceiling opening, thus creating more desirable effects, concealing an unpleasant outside view, adding views of the sun and sky, or opening a room to an imaginary view or enhancing an existing view by the addition of one or all of the above-mentioned choices to any area within a structure through planning and design have been made possible only by the features of this invention.

OBJECT AND SUMMARY OF THE INVENTION

"Windowscaping" is an innovative idea in home design or remodeling, which is increasingly common through the addition of windows, doors or skylight to open up a structure thereby making a room alive with light and an outside view. These home improvement options, however, generally require large outdoor space and may not otherwise be possible for those living in congested housing and apartments developments. Accordingly, the object of this invention is to provide a window containing reflective enclosures which can camouflage an unpleasant view, permit creation of a small defined space with an infinite illusionary vista in all directions, provide far more security than possible with an ordinary window or sliding glass door, reduce noise levels, capture the sun or available light, thereby making rooms more livable, bright, cheerful, pleasant and spacious in feeling, without hindering the primary function thereof. It is an ideal solution for any dark room with small or no windows, insufficient sunlight and an inadequate or unpleasant view. Although the illustrated window with reflective enclosures is only for single family houses, it may also be designed for use in multi-family houses for commercial establishments.

Further objectives and advantages of this invention will become apparent from a consideration of the drawings and detailed description.

BRIEF DESCRIPTION OF THE DRAWINGS

The nature of the invention may be better understood by way of example with reference to the accompanying drawings, which illustrate some of the preferred structural embodiments, in which.

DETAILED DESCRIPTION OF THE INVENTION

Figure 1:
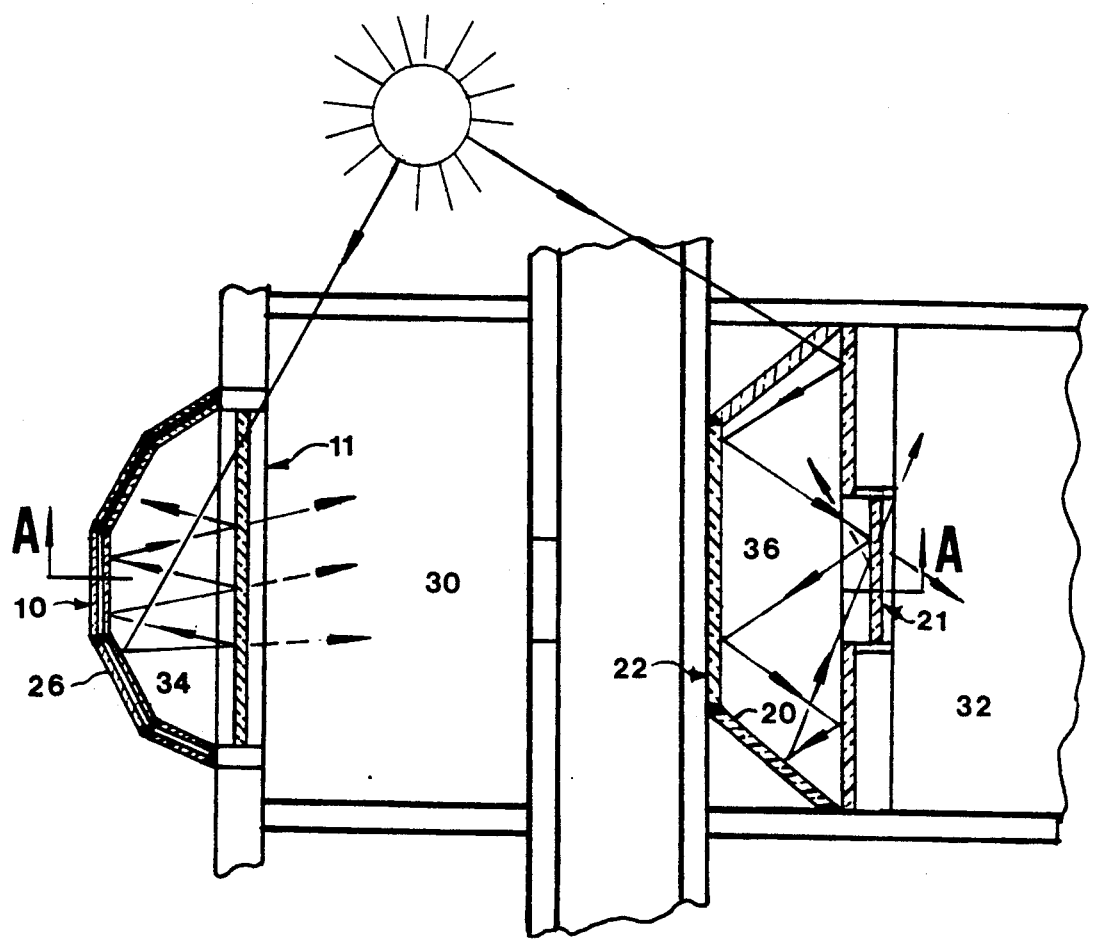
FIG. 1 is a top sectional view of the bay window reflective enclosure and interior wall window with reflective enclosure illustrating the underlying principles of this invention.
Figure 5:
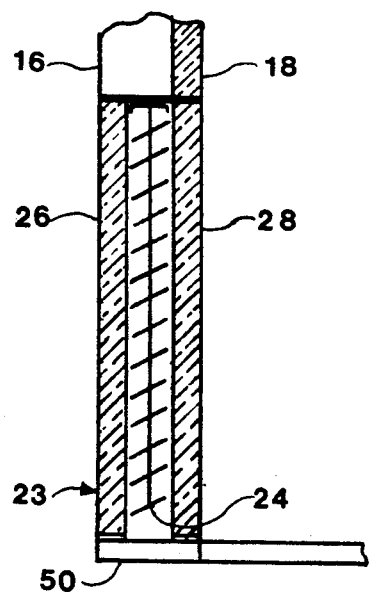
FIG. 5 is a sectional side view taken along the line C—C in FIG. 3.
Figure 2:
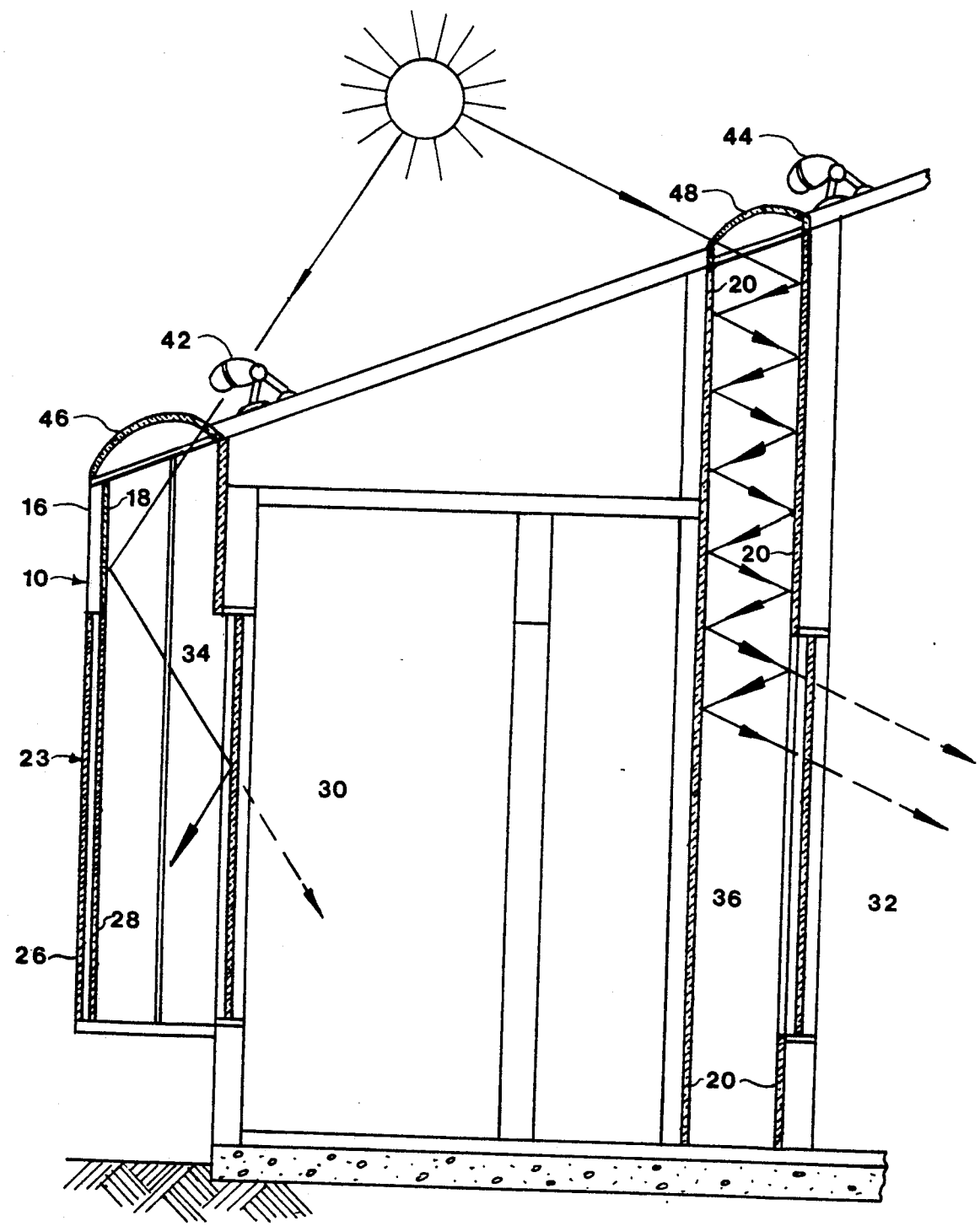
FIG. 2 is a sectional side view taken along the line A—A in FIG. 1 of the bay window reflective enclosure and interior wall window with reflective enclosure illustrating the underlying principle of this invention.
Figure 3:
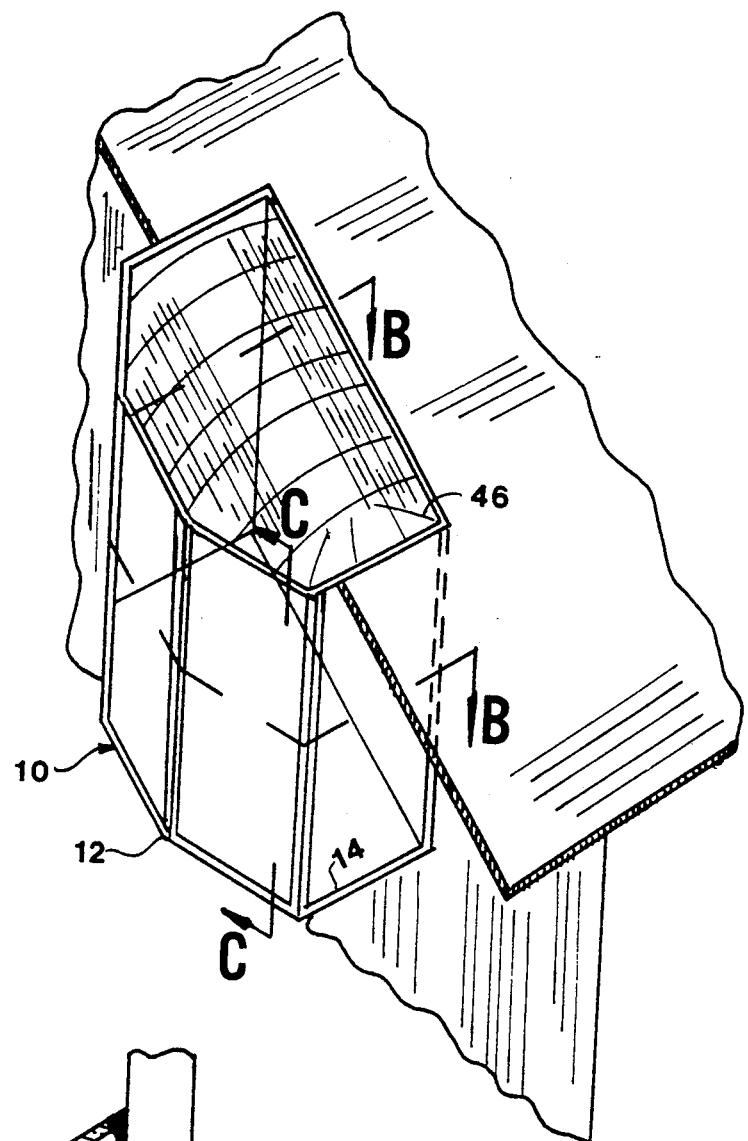
FIG. 3 is an isometric view of the bay window reflective enclosure.
Figure 4:
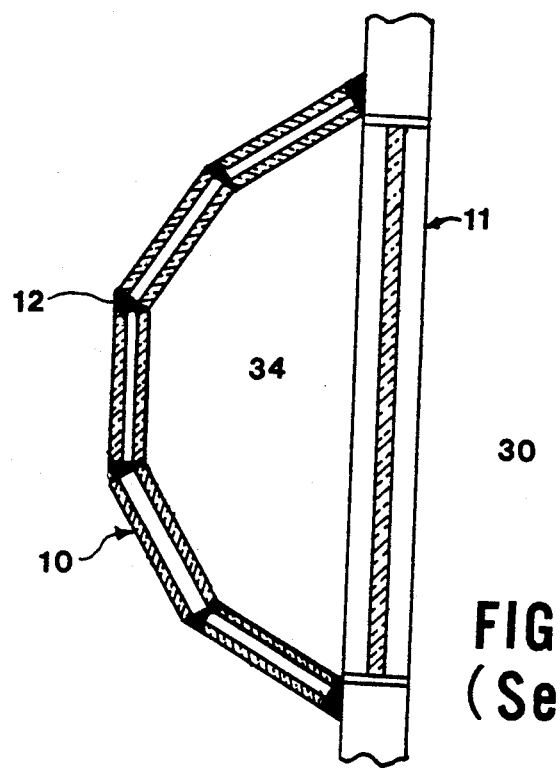
FIG. 4 is a stop sectional view taken along the line B—B in FIG. 3.

In the preferred form of the invention presented in the accompanying drawings, the bay window reflective enclosure 10, adapted to cover an exterior wall window 11, is basically a standard rigid framework comprising three vertical rectangular 12 and two vertical tetragonal 14 frames, connected to form a bow configuration and secured to the exterior wall by any standard means. Each of the bay window enclosure standard rigid frames 12 and 14 including a sill member a head member, and vertical side members. Vertical side members of adjacent frames being interconnected by any standard means. These vertical frames are adapted to receive double-pane glass window 23 at the bottom portion and the light-reflective panels 18 at the upper portion of the bay window enclosure. For the outer ply 16 of the upper portion of bay window enclosure, any suitable material, matching or compatible with the house exterior, may be used. For the inner ply 18 of the upper portion of the bay window enclosure 10 and the inner ply 20 of an interior wall window 21 with reflective enclosure 22, light reflective panels are be used.

In the preferred embodiment of bay window enclosure, double-pane glass windows 23, with a standard shading devices 24 between panes shall be installed. For outside panes 26, standard window glass is appropriate. For inside panes 28, reflective glass are used.

For the exterior wall window 11 and the interior wall window 21, transparent mirror panes shall be used. In order to have a sufficient reflection, a light transmission to reflectance ratio of the transparent mirror windows 11 and 21 must be properly selected.

With subdued light on the room side 30 and 32, fully drawn shading devices 24, and bright lighting on the enclosure of shaft side 34 and 36, exterior wall window 11 and interior wall window 21 shall function as a transparent window for the observer, but looks like an ordinary mirror from the enclosure 34 or shaft side 36. So its function dual: to convey light and a view of the sky, as well as create the endless reflection of the sun and interior design, and to "enlarge" a small space of the exterior wall window enclosure 34 or interior wall window shaft 36 creating amusing distortions. As a result, it gives one the impression of looking at an infinite vista, when in fact it is an illusionary image and the effect of multiple reflections, in a carefully planned and executed design. Therefore, it is possible to enjoy view of the outside at will with pulled up shading devices 24, or create an infinite vista with fully drawn shading devices 24. Variable level of illumination at night may be provided by using a dimer control on incandescent fixtures 42 and 44.

Figure 6:
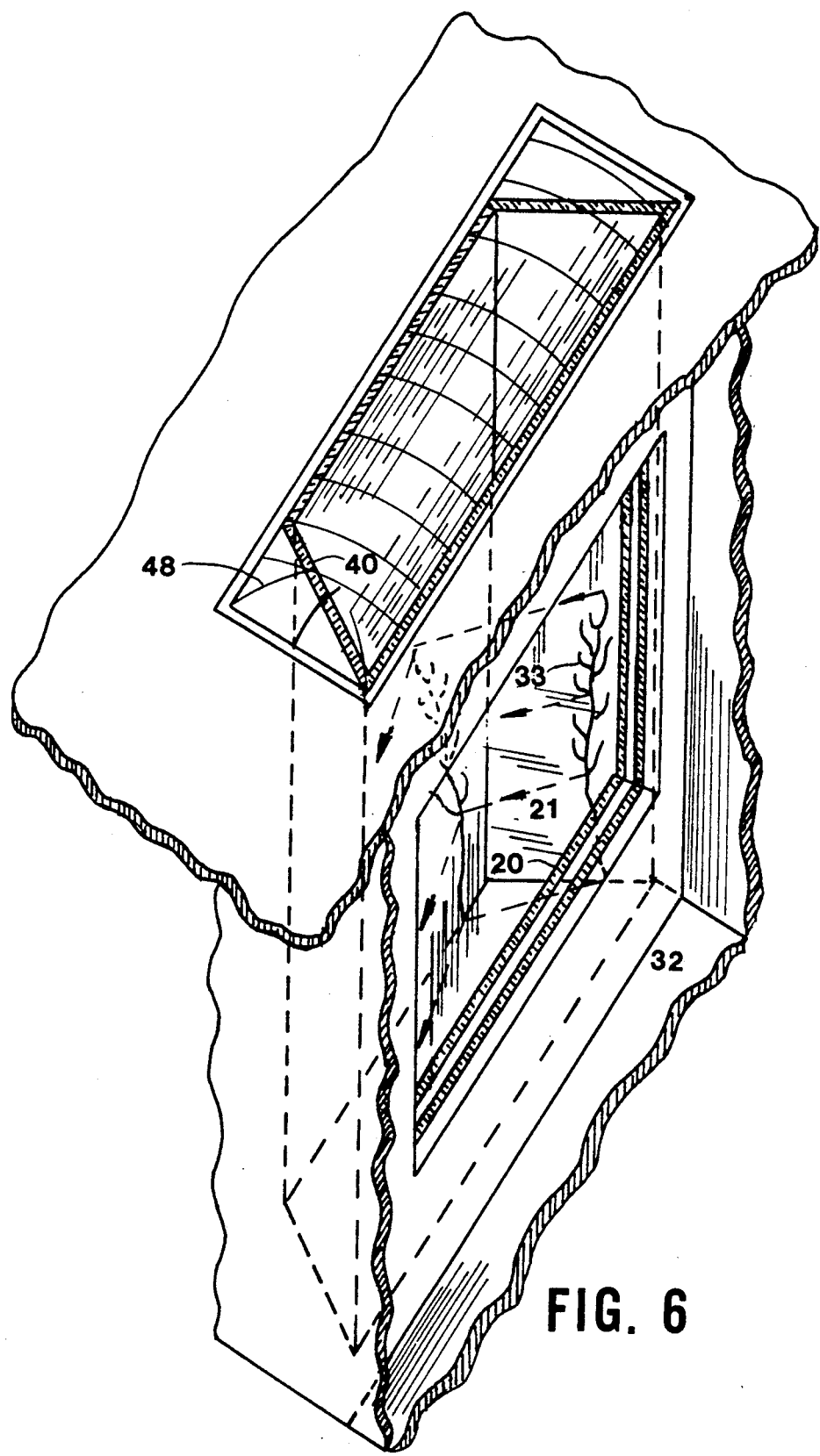
FIG. 6 is an isometric view of the interior wall window with reflective enclosure.

The bay window reflective enclosure 10 and interior wall window reflective enclosure 22, subject of this invention, shall be tailored to the particular site, family lifestyle, and local weather. Therefore, the sizes, numbers and angles of the side panels 38 and 40 should be such that, when viewed throughout the rooms 30 and 32 on FIG. 1, one can see multiple reflection of the sky and interior design/landscape 33 (FIG. 6), which creates most dazzling, intriguing, memorable and enchanting fantasy.

The bay window reflective enclosure 10 and interior wall window reflective enclosure 22 may be pre-assembled and adapted for positioning around a window or sliding glass door opening. The width dimensions of the exterior wall window 11 and interior wall window 21 shall be suitably proportioned with respect to the exterior and interior wall openings respectively.

In order to provide for the transmission of light inside of the reflective enclosures 10 and 22, and protect interior of these enclosures from rain, snow or dust, a suitable roof membranes 46 and 48 being of a light translucent material, and the bottom enclosure 50 being of any suitable material, shall be installed. The translucent roof membranes, such as comprised in a known skylight or roof window may be easily adapted for this purpose.

In order to provide natural or induced air flow for a heating or cooling as necessary, a standard ventilation system, not subject of this invention, may be easy incorporated in this design.

I claim:

1. In an arrangement, the combination of a bay window structure for enclosing an exterior wall window, said structure having a roof membrane of light translucent material and a light and sky view channeling means, the improvement comprising:
   (a) a rigid framework having marginal dimensions larger in size than said exterior wall window, said rigid framework having a plurality of vertical rectangular and the like frames, whereby said vertical rectangular frames are positioned in predetermined angular relation forming a bay configuration and defining an outer boundary of said bay window structure, thereby enclosing the space between said rigid framework and said exterior wall window, each of said vertical rectangular frames including a sill member, a head member, and vertical side members, adjacent side members of adjacent rectangular frames being interconnected by means, said vertical rectangular frames adapted to receive a bay window panels and a plurality of light-reflective panels, said rigid framework secured to said exterior wall;
   (b) said bay window panels having shading means between a double-pane with an inside pane comprising a reflective glass and an outside pane a transparent window glass, said bay window panels secured to said rigid framework, an interior sill edges of said bay window panels lying in a planar zone adapted to correspond to the planar zone of a bottom edge of said exterior wall window, an interior head edges of said bay window panels lying in a planar zone adapted to correspond to the planar zone of a top edge of said exterior wall window;
   (c) said light and sky view channeling means attached at upper end around said room membrane and at the bottom end directly overlying said interior head edges of said bay window panels, said light and sky view channeling means comprising said light-reflective panels being fixedly attached to an upper portion of said rigid framework and adapted to cover said exterior wall zone defined by an outer boundary of said exterior wall window and by an inner boundary of said rigid framework vertical side members secured to said exterior wall;
   (d) said exterior wall window adapted to receive a transparent mirror pane and to fit around an exterior wall opening such as provided by a window frame and the like and secured to said exterior wall.

2. The construction of claim 1, wherein said rigid framework is adapted for positioning around an interior wall opening such as provided by a window frame or the like, comprising an interior wall window adapted to receive said transparent mirror pane, and said light-reflective panels adapted to cover the interior wall zone defined by an outer boundary of said interior wall opening and by an inner boundary of said rigid framework vertical side members secured to said interior wall on side of said rigid framework, and said light-reflective panels adapted to cover an interior wall of said enclosure defined by said rigid framework members.

3. The construction of claim 2, wherein said rigid framework top is open or closed by said roof membrane of light translucent material, thereby permitting transmission of light and a view of the sky.

4. The construction of claim 1, wherein said bay window structure top and bottom are open, thereby mainly camouflaging an unpleasant outside view and permitting transmission of light and a view of the sky.

* * * * *